(12) United States Patent
Tsai et al.

(10) Patent No.: US 9,859,549 B2
(45) Date of Patent: Jan. 2, 2018

(54) STEPWISE-STACKED SEAWATER BATTERY ASSEMBLY

(71) Applicant: TAIWAN CARBON NANO TECHNOLOGY CORPORATION, Miaoli County (TW)

(72) Inventors: Chun-Hsien Tsai, Miaoli County (TW); Kuang-Che Lee, Miaoli County (TW); Chun-Jung Tsai, Miaoli County (TW); Ting-Chuan Lee, Miaoli County (TW); Yuan-Shin Huang, Miaoli County (TW)

(73) Assignee: Taiwan Carbon Nano Technology Corporation, Zhunan Township, Miaoli County (TW)

( * ) Notice: Subject to any disclaimer, the term of this patent is extended or adjusted under 35 U.S.C. 154(b) by 201 days.

(21) Appl. No.: 15/012,186

(22) Filed: Feb. 1, 2016

(65) Prior Publication Data

US 2016/0240837 A1 Aug. 18, 2016

(30) Foreign Application Priority Data

Feb. 13, 2015 (TW) .............................. 104104915 A

(51) Int. Cl.
*H01M 6/34* (2006.01)
*H01M 2/40* (2006.01)
(Continued)

(52) U.S. Cl.
CPC ............. *H01M 2/40* (2013.01); *H01M 6/045* (2013.01); *H01M 6/34* (2013.01); *H01M 4/46* (2013.01);
(Continued)

(58) Field of Classification Search
CPC .......... H01M 2/40; H01M 6/34; H01M 6/045; H01M 4/583; H01M 4/46; H01M 2300/0002
See application file for complete search history.

(56) References Cited

U.S. PATENT DOCUMENTS 3,804,673 A    4/1974   Butler
3,902,918 A *  9/1975   Pompon ................. H01M 2/40
                                                         429/417

(Continued)

*Primary Examiner* — Lisa S Park
(74) *Attorney, Agent, or Firm* — Muncy, Geissler, Olds & Lowe, P.C.

(57) ABSTRACT

A stepwise-stacked seawater battery assembly comprises a first battery chamber, a second battery chamber, a seawater electrolytic liquid, and an electric-conduction set. The first battery chamber includes a first accommodation room and a first electrode group. The second battery chamber is disposed above the first battery chamber and includes an opening, a second accommodation room interconnecting with the opening, and a second electrode group disposed in the second accommodation room. The seawater electrolytic liquid includes a first electrolytic liquid received by the first accommodation room and a second electrolytic liquid received by the second accommodation room. The electric-conduction set electrically connects the first electrode group and the second electrode group. The structural design that the first battery chamber receives the first electrode group and the second battery chamber receives the second electrode group can simplify the structure of the seawater battery assembly.

5 Claims, 4 Drawing Sheets

(51) Int. Cl.
*H01M 6/04* (2006.01)
*H01M 4/46* (2006.01)
*H01M 4/583* (2010.01)

(52) U.S. Cl.
CPC .... *H01M 4/583* (2013.01); *H01M 2300/0002* (2013.01)

(56) References Cited

U.S. PATENT DOCUMENTS

| | | | | |
|---|---|---|---|---|
| 4,198,474 A | * | 4/1980 | Shah | H01M 2/22 429/119 |
| 4,421,831 A | * | 12/1983 | Garcia, Jr. | H01M 6/34 429/119 |
| 4,612,262 A | * | 9/1986 | Grevstad | H01M 8/04283 429/442 |

* cited by examiner

STEPWISE-STACKED SEAWATER BATTERY ASSEMBLY

FIELD OF THE INVENTION

The present invention relates to a seawater battery, particularly to a stepwise-stacked seawater battery assembly.

BACKGROUND OF THE INVENTION

The battery is a device converting the chemical energy stored thereinside into electric energy. Recently, most nations have raised their standards of environmental protection. Therefore, the batteries unlikely to generate pollution, such as fuel batteries, solar batteries and seawater batteries, have attracted more and more attention and become the R&D focus of the manufacturers in the field.

The seawater battery uses seawater as the electrolytic liquid thereof and generates electricity as long as they are immersed in seawater. Therefore, seawater batteries attract much attention in marine and offshore applications. In order to output higher power, seawater batteries are connected in series or in parallel in most applications. A U.S. Pat. No. 3,804,673 disclosed a "Sea Water Battery Casing for Minimizing Intercell Short Circuits", which pertains to a cascade seawater battery assembly less likely to suffer internal short circuit and comprises a plurality of batteries connected in series. Each battery includes a cathode, an anode, a dielectric casing, a plurality of dielectric blocks, and a plurality of through-holes formed in the dielectric casing. The cathode, the anode and the dielectric blocks are disposed inside the dielectric casing. The dielectric blocks are arranged between the cathode and the anode to separate the cathode and the anode. The through-holes enable seawater to flow among the batteries.

However, the conventional seawater battery assemblies usually have complicated channel structure to enable seawater to flow among the batteries. Therefore, the conventional seawater battery assemblies are normally expensive, bulky and hard to popularize.

SUMMARY OF THE INVENTION

The primary objective of the present invention is to solve the problem of the complicated connection structure of the conventional seawater battery assembly.

To achieve the abovementioned objective, the present invention proposes a stepwise-stacked battery assembly, which comprises a first battery chamber, a second battery chamber, a seawater electrolytic liquid, and an electric-conduction set. The first battery chamber includes a first accommodation room and a first electrode group disposed in the first accommodation room. The first electrode group has a first cathode and a first anode. The second battery chamber is disposed above the first battery chamber and includes an opening above the first accommodation room, a second accommodation room interconnecting with the opening, and a second electrode group disposed in the second accommodation room. The second electrode group has a second cathode and a second anode. The electric-conduction set electrically connects the first electrode group and the second electrode group. The seawater electrolytic liquid includes a first electrolytic liquid received by the first accommodation room and contacting the first electrode group and a second electrolytic liquid received by the second accommodation room and contacting the second electrode group. The first electrolytic liquid and the second electrolytic liquid have an altitude drop therebetween. The second electrolytic liquid leaves the second accommodation room through the opening to form a plurality of discontinuous liquid droplets flowing into the first electrolytic liquid in the first accommodation room and making the second electrolytic liquid in the second accommodation room electrically isolated from the first electrolytic liquid in the first accommodation room.

Thus, the present invention is characterized in
1. The opening of the second battery chamber facilitates the discontinuity of the droplets of the second electrolytic liquid before it flows into the first electrolytic liquid and results in the electric isolation of the droplets. Thereby, internal short circuit would not occur between the first electrolytic liquid and the second electrolytic liquid. Therefore, the first battery chamber and the second battery chamber can be connected in series or in parallel for application. Further, the electrolytic liquid can be shared by the first battery chamber and the second battery chamber and used cyclically.
2. The present invention is exempted from complicated structure and perplexed pipelines, having low fabrication cost.

DETAILED DESCRIPTION OF THE PREFERRED EMBODIMENTS

The technical contents of the present invention will be described in detail in cooperation with drawings below.

Figure 1A:
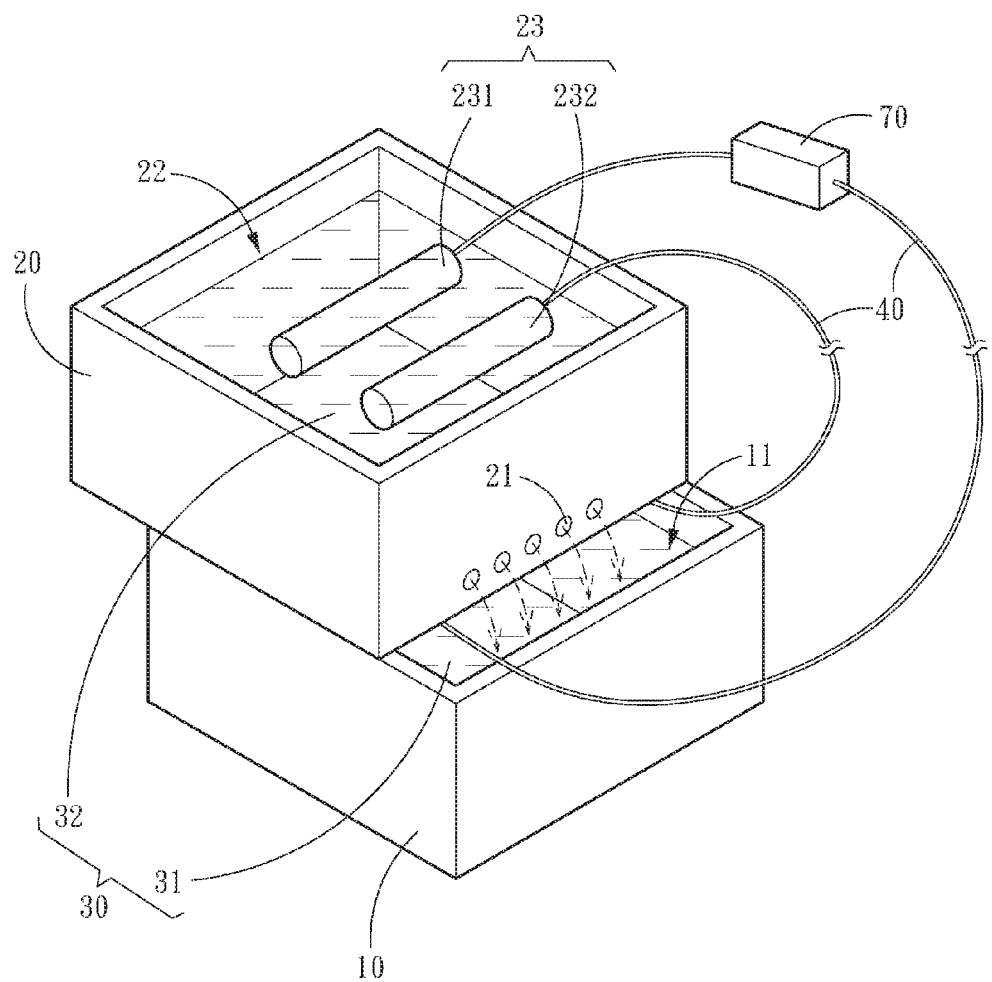
FIG. 1A is a perspective view schematically showing the structure of a stepwise-stacked seawater battery assembly according to a first embodiment of the present invention.
Figure 1B:
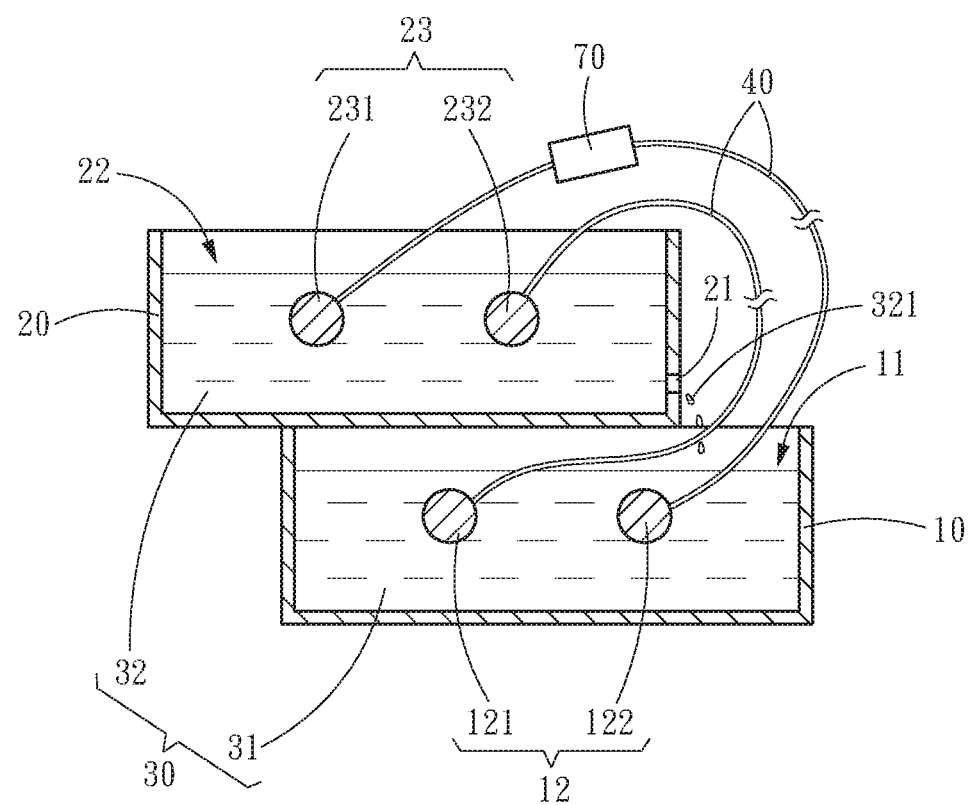
FIG. 1B is a sectional view schematically showing the structure of a stepwise-stacked seawater battery assembly according to the first embodiment of the present invention.

Refer to FIG. 1A and FIG. 1B for a first embodiment of the present invention. The present invention proposes a stepwise-stacked seawater battery assembly, which comprises a first battery chamber 10, a second battery chamber 20, a seawater electrolytic liquid 30, and an electric-conduction set 40. The first battery chamber 10 is disposed below the second battery chamber 20 to form a stepped structure. The first battery chamber 10 includes a first accommodation room 11 and a first electrode group 12. The first electrode group 12 has a first cathode 121 and a first anode 122, which are arranged oppositely inside the first accommodation room 11. The second battery chamber 20 includes an opening 21 above the first accommodation room 11, a second accommodation room 22 interconnecting with the opening 21, and a second electrode group 23. The second electrode group 23 has a second cathode 231 and a second anode 232, which are arranged oppositely inside the second accommodation room 22. In the first embodiment shown in FIG. 1A, the second battery chamber 20 has 5 openings 21 each with a diameter of 1-10 mm. The seawater electrolytic liquid 30 includes a first electrolytic liquid 31 received by the first accommodation room 11 and contacting the first electrode group 12 and a second electrolytic liquid 32 received by the second accommodation room 22 and contacting the second electrode group 23. As the first battery chamber 10 is disposed below the second battery chamber 20, the first electrolytic liquid 31 and the second electrolytic liquid 32 has an altitude drop therebetween. The gravity makes the second electrolytic liquid 32 leave the second accommodation room 22 through the openings 21 to form a plurality of discontinuous liquid droplets 321 flowing into the first electrolytic liquid 31 in the first accommodation room 11. Because of the discontinuity of the liquid droplets 321, the second electrolytic liquid 32 in the second accommodation room 22 is electrically isolated from the first electrolytic liquid 31 in the first accommodation room 11. In other words, the first electrode group 12 only acts on the first electrolytic liquid 31, and the second electrode group 23 only acts on the second electrolytic liquid 32. The first electrode group 12 and the second electrode group 23 work independently. Thus, internal short circuit is less likely to occur. The altitude difference between the openings 21 and the surface of the first electrolytic liquid 31 influences the formation of the liquid droplets 321 and the electric isolation of the first electrolytic liquid 31 and the second electrolytic liquid 32.

The electric-conduction set 40 electrically connects the first electrode group 12 and the second electrode group 23. In the first embodiment shown in FIG. 1A and FIG. 1B, the electric-conduction set 40 electrically connects the first cathode 121 with the second anode 232 and electrically connects the first anode 122 with the second cathode 231. A load 70 is disposed between the first anode 122 and the second cathode 231 and electrically connected with the first anode 122 and the second cathode 231 in series. Thereby, a cascade battery structure is formed to increase the output voltage. The first cathode 121 and the second cathode 231 are made of a material selected from a group including carbon, copper and metal compounds of the combinations thereof. The first anode 122 and the second anode 232 are made of a material selected from a group including aluminum, magnesium and alloys of the combinations thereof. An electricity collection net (not shown in the drawings) is disposed between the second cathode 231 and the second anode 232 to store the electricity generated by the present invention.

Figure 2:
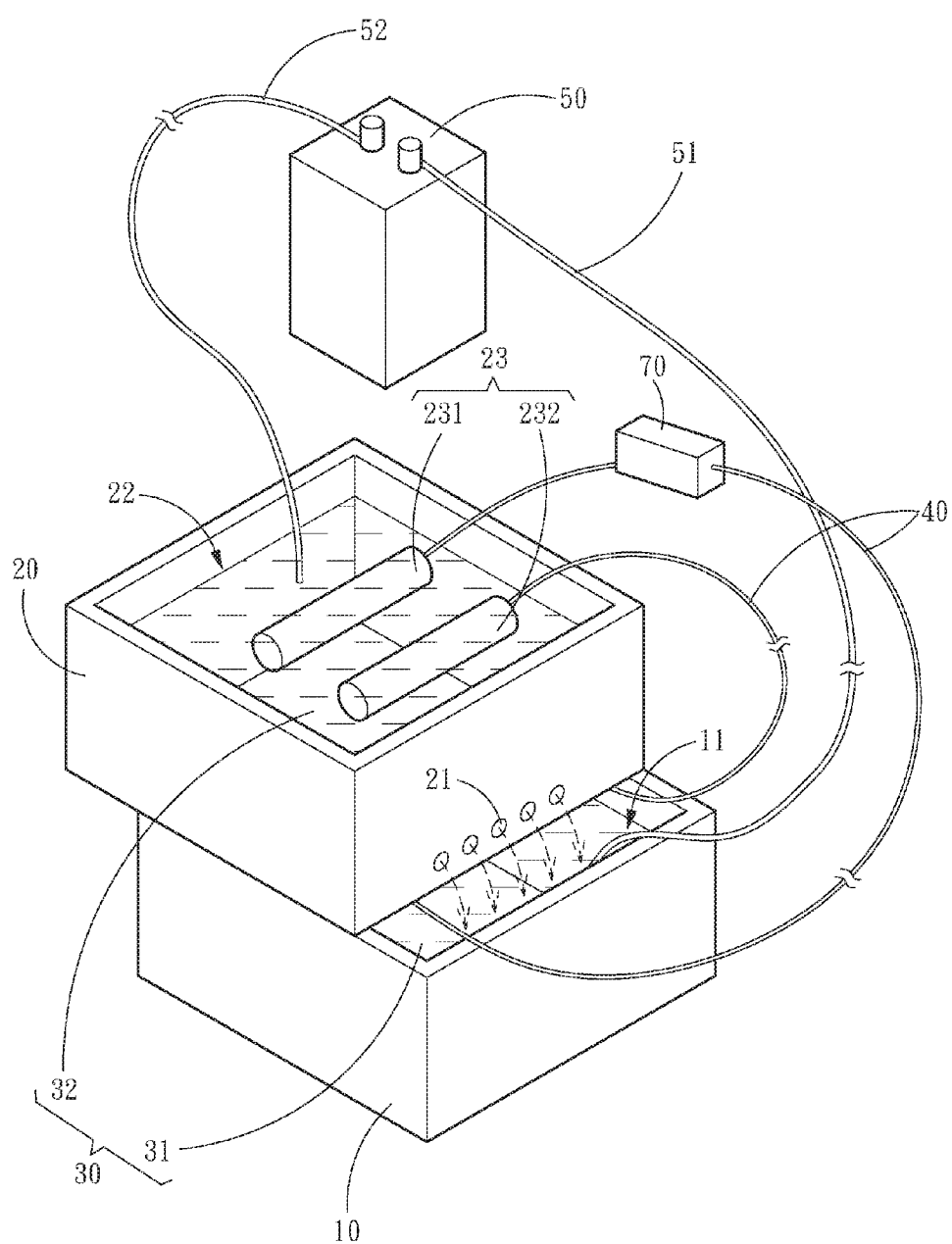
FIG. 2 is a perspective view schematically showing the structure of a stepwise-stacked seawater battery assembly according to a second embodiment of the present invention.

Refer to FIG. 2 for a second embodiment of the present invention. In the second embodiment, the stepwise-stacked seawater battery assembly of the present invention further comprises a pump 50, an output pipeline 51 connected with the first battery chamber 10 and the pump 50, and an input pipeline 52 connected with the second battery chamber 20 and the pump 50. The pump 50 sucks the first electrolytic liquid 31 through the output pipeline 51 and pumps the first electrolytic liquid 31 to the second electrolytic liquid 32 inside the second accommodation room 22 through the input pipeline 52. Then, the second electrolytic liquid 32 flows through the openings 21 into the first electrolytic liquid 31 inside the first accommodation room 11. Thus is formed an independent circulation system with the first electrolytic liquid 31 and the second electrolytic liquid 32 electrically isolated from each other. The present invention may adopt any effective transferring device to transfer the first electrolytic liquid 31 to the second battery chamber 20, such as a capillary. In the second embodiment shown in FIG. 2, the pump 50 is used to exemplify the transferring device.

Figure 3:
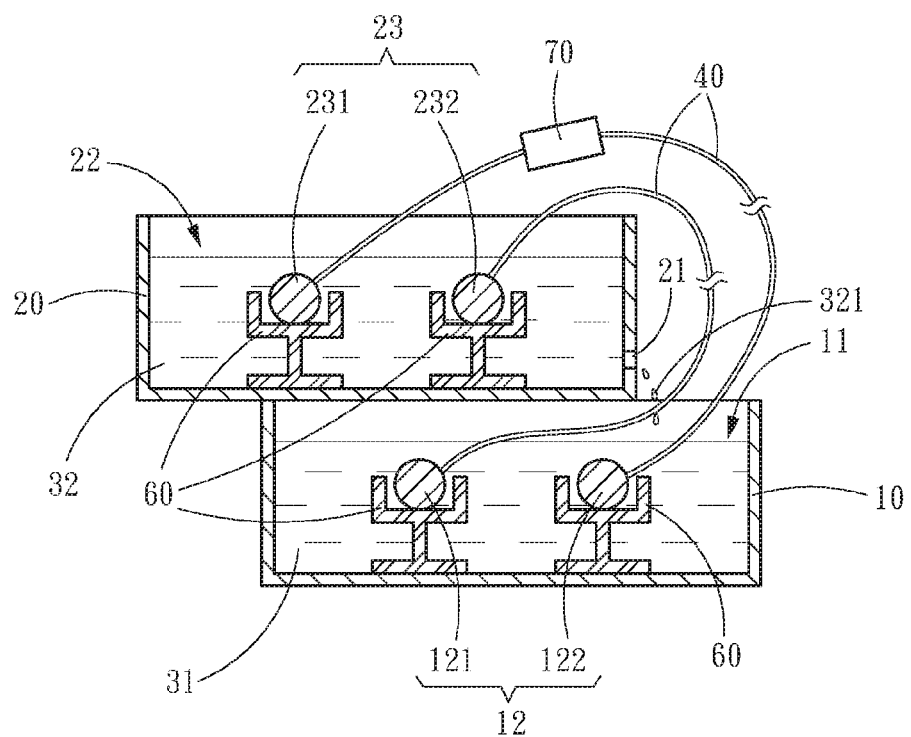
FIG. 3 is a local sectional view schematically showing the structure of a stepwise-stacked seawater battery assembly according to a third embodiment of the present invention.

Refer to FIG. 3 for a third embodiment of the present invention. In the third embodiment, the stepwise-stacked seawater battery assembly of the present invention further comprises a plurality of plastic frame seats 60 respectively disposed in the first battery chamber 10 and the second battery chamber 20 and receiving the first cathode 121, the first anode 122, the second cathode 231 and the second anode 232 to prevent the first electrode group 12 and the second electrode group 23 from being drifted by the circulation of the seawater electrolytic liquid 30 lest the first cathode 121 contact the first anode 122 and the second cathode 231 contact the second anode 232. Thereby is avoided the problem of short circuit.

Figure 4:
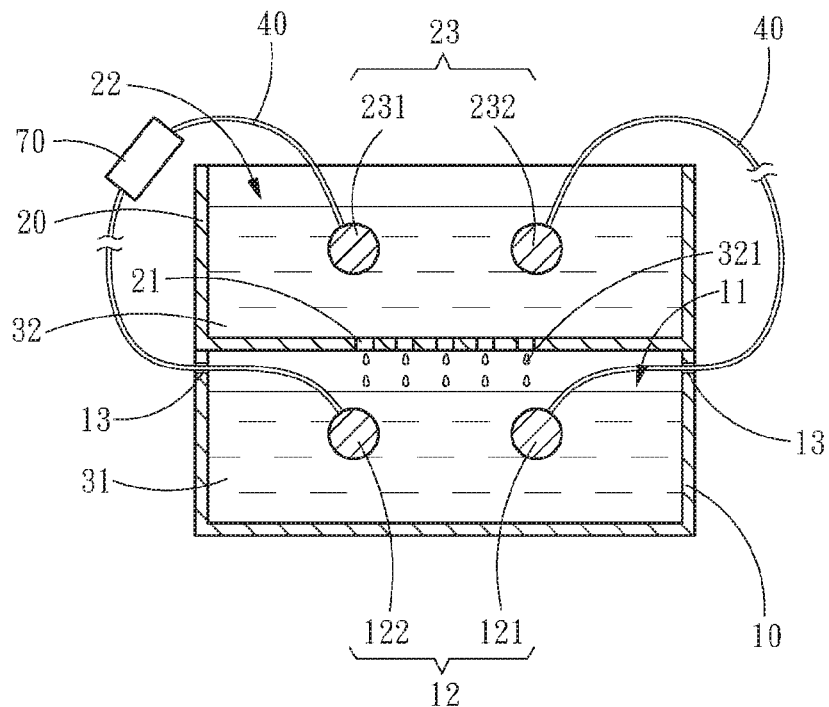
FIG. 4 is a local sectional view schematically showing the structure of a stepwise-stacked seawater battery assembly according to a fourth embodiment of the present invention.

Refer to FIG. 4 for a fourth embodiment of the present invention. In the fourth embodiment, the first battery chamber 10 and the second battery chamber 20 are stacked vertically, and the openings 21 are arranged on the bottom of the second battery chamber 20 to enable the second electrolytic liquid 32 to flow into the first electrolytic liquid 31 inside the first accommodation room 11. The side walls of the first battery chamber 10 has a plurality of throughholes 13, which the electric-conduction set 40 and the output pipeline 51 pass through to enter the first accommodation room 11, whereby the electric-conduction set 40 can electrically connect with the first cathode 121 and the first anode 122, and whereby the pump 50 can suck the first electrolytic liquid 31 through the output pipeline 51.

In all the embodiments mentioned above, the first battery chamber 10 and the second battery chamber 20 are used to exemplify the battery chambers of the present invention. However, the present invention can connects more than two battery chambers in series in practical application.

In summary, the present invention is characterized in

1. The openings of the second battery chamber enables the second electrolytic liquid to form a plurality of discontinuous liquid droplets before the second electrolytic liquid flows into the first electrolytic liquid. Because of the discontinuity of the liquid droplets, the second electrolytic liquid is electrically isolated from the first electrolytic liquid. Thus, internal short circuit will not occur between the second electrolytic liquid and the first electrolytic liquid. Therefore, the first battery chamber and the second battery chamber can be connected in series or in parallel for application. Further, the electrolytic liquid can be shared by the first battery chamber and the second battery chamber and used cyclically.
2. The present invention involves neither complicated structure nor perplexed pipelines and thus can be fabricated in a low cost.
3. The electric-conduction set electrically connects the first electrode group and the second electrode group, wherein the first cathode is electrically with the second anode and the first anode is electrically connected with the second cathode, whereby the battery chambers are connected in series to form a cascade battery assembly having increased output voltage.
4. The pump and openings of the present invention realizes cyclic usage of the seawater electrolytic liquid.
5. The plastic frame seats prevent the first electrode group and the second electrode group from being drifted by the circulation of seawater electrolytic liquid lest the first cathode contact the first anode and the second cathode contact the second anode. Thus is avoided the problem of short circuit.

What is claimed is:

1. A stepwise-stacked seawater battery assembly comprising a first battery chamber including a first accommodation room and a first electrode group disposed in the first accommodation room, wherein the first electrode group has a first cathode and a first anode, which are arranged oppositely;

a second battery chamber disposed above the first battery chamber and including an opening formed over the first accommodation room, a second accommodation room interconnecting with the opening, and a second electrode group disposed in the second accommodation room, wherein the second electrode group has a second cathode and a second anode, which are arranged oppositely;

a seawater electrolytic liquid including a first electrolytic liquid received by the first accommodation room and contacting the first electrode group and a second electrolytic liquid received by the second accommodation room and contacting the second electrode group, wherein the first electrolytic liquid and the second electrolytic liquid has an altitude drop therebetween; and an electric-conduction set electrically connecting the first electrode group and the second electrode group, wherein the second electrolytic liquid leaves the second accommodation room through the opening to form a plurality of discontinuous liquid droplets flowing into the first electrolytic liquid in the first accommodation room to make the first electrolytic liquid in the first accommodation room and the second electrolytic liquid in the second accommodation room electrically isolated from each other.

2. The stepwise-stacked seawater battery assembly according to claim 1 further comprising a pump, an output pipeline connected with the first battery chamber and the pump, and an input pipeline connected with the second battery chamber and the pump.

3. The stepwise-stacked seawater battery assembly according to claim 1, wherein opening has a diameter of 1-10 mm.

4. The stepwise-stacked seawater battery assembly according to claim 1, wherein the first cathode and the second cathode are made of a material selected from a group including carbon, copper and metal compounds of combinations thereof.

5. The stepwise-stacked seawater battery assembly according to claim 1, wherein the first anode and the second anode are made of a material selected from a group including aluminum, magnesium and alloys of combinations thereof.

* * * * *